Sept. 20, 1966  D. BERDAN  3,274,529
CROSS-BAR DISTRIBUTION PANEL
Filed Feb. 12, 1964  2 Sheets-Sheet 1

INVENTOR.
DAVID BERDAN
BY Brumbaugh, Free, Graves &
Donohue
his ATTORNEYS.

Sept. 20, 1966 D. BERDAN 3,274,529
CROSS-BAR DISTRIBUTION PANEL
Filed Feb. 12, 1964 2 Sheets-Sheet 2

INVENTOR.
DAVID BERDAN
BY Brumbaugh, Free, Graves &
Donohue
his ATTORNEYS.

United States Patent Office 3,274,529
Patented Sept. 20, 1966

1

3,274,529
CROSS-BAR DISTRIBUTION PANEL
David Berdan, Freehold, N.J., assignor to Buck Engineering Company, Inc., Freehold, N.J., a corporation of New Jersey
Filed Feb. 12, 1964, Ser. No. 344,443
6 Claims. (Cl. 339—18)

This invention relates to distribution panels for electrical circuits and, more particularly, to a novel and improved crossbar distribution panel having improved conductive elements and having means for limiting the number of circuit connections which can be made to that which can be safely sustained by the conductive elements or the electrical or electronic devices connected thereto.

Distribution panels consisting of crossed series of conductors which are interconnected by pins or the like at predetermined cross over points provide efficient and reliable selective interconnection of electrical devices. This type of distribution panel, which is often referred to as crossbar distribution panel, provides a considerable degree of versatility in forming desired circuit connections without necessitating a complicated arrangement of switches or the like and has the advantages of low cost, small size and safe and reliable operation. Such distribution panels have a great many uses in electrical and electronic systems.

One important use of crossbar distribution panels is for electrical power distribution for machinery wherein one series of conductors is connected to several available power supplies, while another series is coupled to the machinery. In most power distribution panels of this type it is possible to accidentally connect more than one power input circuit to a given output circuit or to short circuit the power source, thereby overloading and possibly burning out the apparatus connected to the circuits. For safer operation some crossbar distribution panels used for power distribution systems include safety devices which are designed to prevent the interconnection of input and output circuits beyond a safe condition. Moreover, each individual output circuit may be provided with a fuse or circuit breaker to prevent the power overload from reaching the equipment.

Mechanical systems for preventing the insertion of the connecting plugs into the circuits have been suggested. The presently known mechanical safety devices are generally actuated by auxiliary pins or levers or the like associated with the connecting plug or separate therefrom and require relatively complicated structure or mechanical systems. Accordingly, the cost of making the panel is relatively high and the greater number of parts increases the chance of breakdown and failure of the system to work properly.

There is provided, in accordance with the invention, a novel and improved crossbar distribution panel comprising a front panel structure and two series of electrical conductors mounted on the panel, one series crossing and insulated from the other series. The conductors have aligned openings for receiving conductive pins to interconnect selected conductors of each series of conductors. Means are provided in the panel structure operable by the conductive pins themselves to prevent the simultaneous positioning of any more than a predetermined number of pins in a given conductor of one or both series.

More particularly, the panel has a plurality of slots formed therein, one slot overlying each of the conductors of one or both the series. Each slot carries a plurality of blocking pieces which are slidable longitudinally therein, each blocking piece extending between adjacent openings in the conductors. The relationship between the lengths of the slots and the cumulative length of the blocking pieces therein is such that when a predetermined number

2 of pins are positioned in the openings of the corresponding conductor, thereby moving the blocking pieces on either side of the pins apart, no further movement of the blocking pieces is possible. Accordingly, no additional pins may be inserted into that conductor.

The blocking arrangement requires no pins or mechanisms supplemental to the conductive pins on the connecting plugs, thereby simplifying the structure and operation of the distribution panel and positively preventing unsafe connections from being accidentally made. The blocking pieces are preferably made of electrically nonconductive material, thereby affording further safety from short circuiting between the conductive elements and the front plate of the distribution panel.

A further feature of a distribution panel, in accordance with the invention, is a reduction in size and weight of the conductors, and a consequent lowering of the costs of making, shipping, and installing the panel. In conventional distribution panels the conductors are generally of uniform cross-section and holes are formed in them for the connecting pins. The maximum current carrying capacity of the conductors is determined by the cross-sectional area through them at the holes, and therefore, the major portion of their length contains a large excess of capacity and material. Further, the contact surfaces of the holes and the pin are of limited area, thereby providing large resistance losses between the conductors and pins.

In a distribution panel, in accordance with the invention, the plug receiving openings are defined by tubular inserts of somewhat greater width than that of the conductors, thereby placing around the perimeter of the openings an amount of material sufficient to replace at least the greater portion of material that would otherwise be removed to form the pin-receiving openings. Accordingly, the conductor cross-sections may be minimized to those providing the desired conducting capacities. Further, the inserts provide a large contact area between the pins and the conductors, thereby providing relatively low resistance losses between them.

For a better understanding of the invention, reference may be made to the following description of an exemplary embodiment taken in conjunction with the figures of the accompanying drawing, in which.

Figure 1:
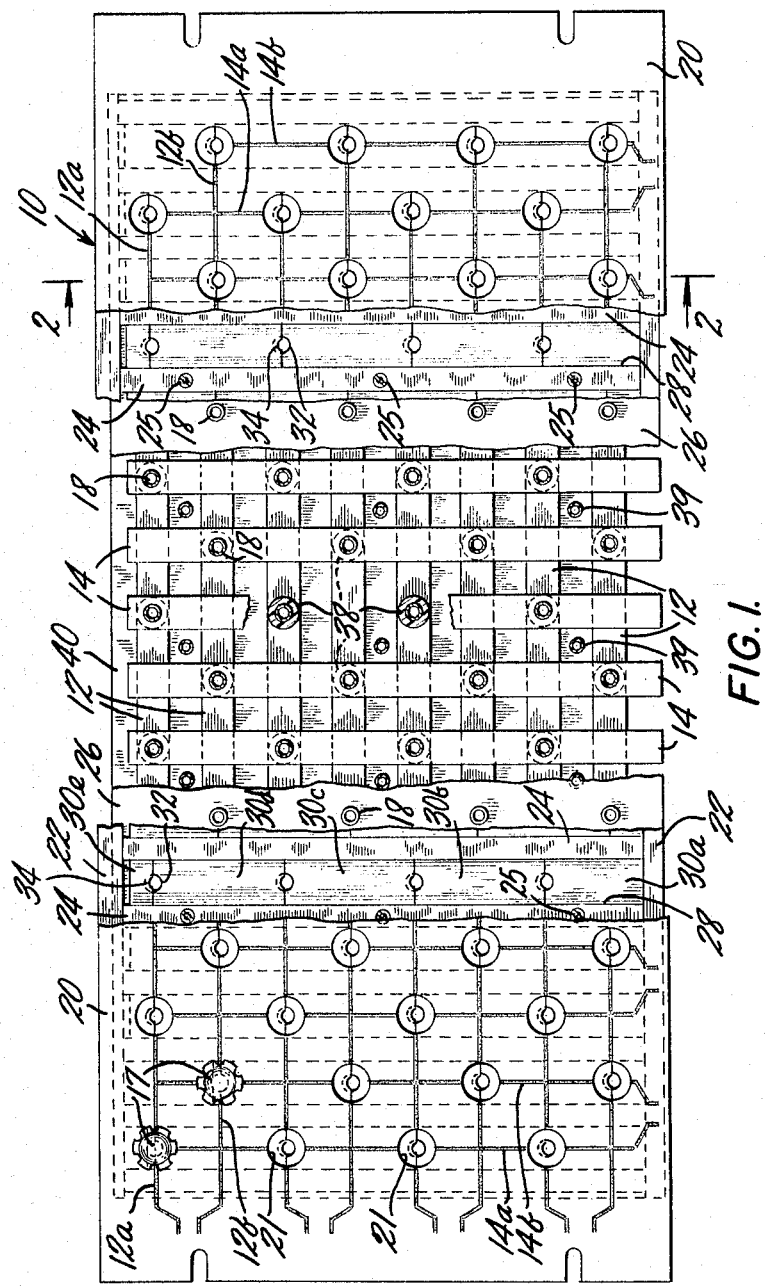
FIGURE 1 is a plan view of the distribution panel showing successive portions broken away to reveal the elements thereof.
Figure 2:
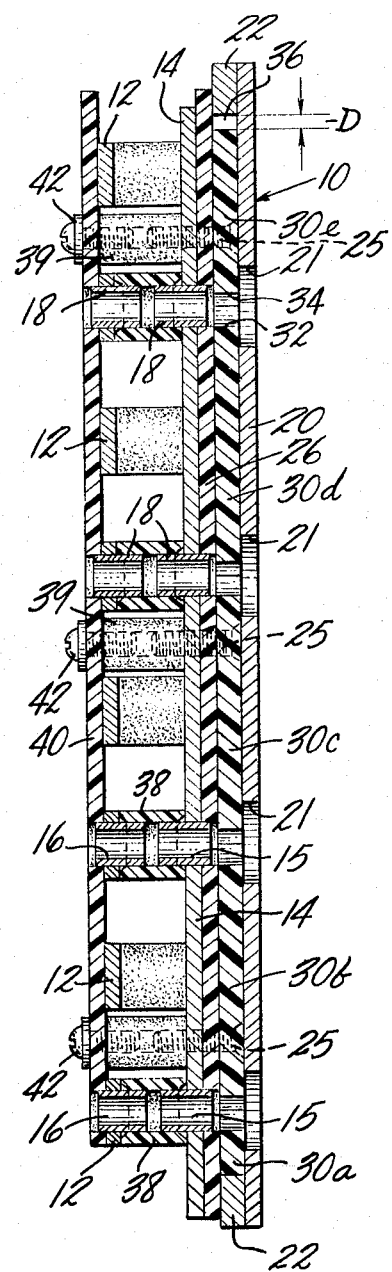
FIG. 2 is an end view in section on an enlarged scale of the panel taken generally along the line 2—2 of FIG. 1.

Referring to FIGS. 1 and 2, the crossbar distribution panel comprises a front panel assembly 10, a plurality of longitudinally extending conductors 12 and a plurality of laterally extending conductors 14, the conductors crossing each other and mounted behind the panel assembly 10 in spaced-apart relation. Each pair of adjacent longitudinally extending conductors 12 provides an input circuit, and each pair of laterally extending conductors provides an output circuit, the circuits being represented on the face of the panel by lines 12a, 12b and 14a, 14b which may be painted or otherwise applied to the front plate. The circuit element of both the input and output circuits having the same letter designation have the same polarity.

At the crossover points of the conductors 12 and 14 of like polarity are aligned openings 15 and 16 for receiving conductive pins 17' on connector plugs 17 to enable selective interconnection of the input and output circuits. To achieve the most efficient use of the conductive material used in the conductors, which is preferably copper, the openings 15 and 16 contain tubular inserts 18 soldered into place in holes in the conductors. The tubular inserts 18 provide, in the area of the holes in the conductors 12 and 14 in which they are installed, a conductive capacity equal to or greater than that of the cross-section of the conductor itself, thereby compensating for the material removed from the conductors to provide the openings for the connecting plugs. Therefore, the conductors may be of a minimum cross-section to provide the desired capacity. Besides enabling a reduction in the cross-section of the conductors, the inserts 18 have a large area of contact with the connecting plug pins, thereby minimizing the effect of losses due to resistance across the contact surface between the conductors 12 and 14 and the pins 17'.

The front panel assembly 10 includes a front plate 20, which may be made of steel, aluminum or other rigid material which provides adequate structural support and protection for the conductive elements, having openings 21 for the plugs 17, the openings 21 being considerably larger than the pins 17' to preclude any chance of shorting the panel 20 to the conductors. Edge members 22 are provided about the perimeter of and on the back of the plate 20. Extending between the upper and lower edge members 22 and spaced from each other are a plurality of strips 24, alternate strips having threaded studs 25 extending in a direction away from the plate 20. Both the edge members 22 and the strips 24 may be of the same material as the front plate 20 and may be spot welded or otherwise secured thereto. The back surface of the assembly 10 supports a sheet 26 of an electrically nonconductive material.

Figure 3:
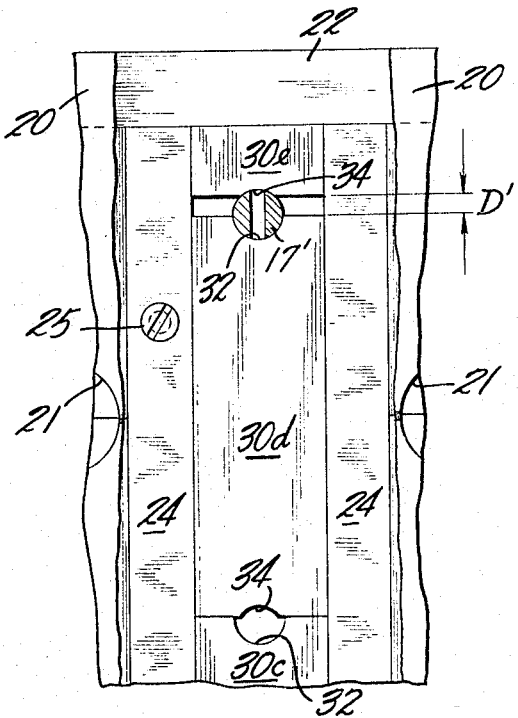
FIG. 3 is a plan view of the blocking arrangement in the panel on an enlarged scale, a portion of the front plate being broken away to clearly reveal the blocking arrangement.

The rear surface of the front plate 20, the front surface of sheet 26, the edges of the strips 24, and the upper and lower ends of the edge members 22 define a plurality of laterally arranged channels 28 in the panel assembly 10, which overlie the output conductors 14. Each of the channels 28 slidably receives a number of blocking pieces 30, which are made of an electrically nonconductive material. The lowermost blocking piece 30a extends from the lower reinforcing member 22 to the axis of the lowermost connecting plug openings 15 and 16 in the conductors, and each successive blocking piece 30b, 30c and 30d, moving upwardly, extends between the successive plug openings. The uppermost blocking piece 30e extends from the uppermost plug opening to a predetermined point such that a space 36 remains between the upper end of the piece 30e and the lower edge of the member 22. The dimension D of the space (FIG. 2) is made equal to the displacement D' (FIG. 3) of the blocking piece 30e when the pin 17' of a connecting plug 17 is inserted into one of the sets of aligned openings in the corresponding conductor to form an interconnection. In FIG. 3 the uppermost opening is illustrated as receiving a pin to displace the uppermost blocking piece 30e, but it will be readily apparent from an examination of the structure that the insertion of a pin 17' in any of the openings will cause the same displacement D' of all of the blocking pieces lying above that pin.

At the top of each blocking piece 30 is a semicircular cutout 32 of substantially the same diameter as the pins 17' on the connecting plugs 17. The lower end of each blocking piece has a cutout 34 of a size and shape corresponding to a small segment of a cross-section of the pins 17'. Accordingly, when the blocking pieces abut each other end to end, the pins 17' cannot be inserted through the cutouts 32 and 34, but when the blocking pieces 30 are spaced apart a distance D' (FIG. 3), a pin 17' can pass through the opening defined by the cutouts 32 and 34.

Referring again to FIGS. 1 and 2, the output conductors 14 are mounted directly on the rear surface of the back sheet 26 of the panel assembly 10, holes being provided in the sheet 26 for the projecting parts of the tubular inserts 18 of the conductors. Spacers 38 are placed around each of the opposite projecting portions of the tubular inserts 18 and receive the front projecting parts of the inserts on the input conductors 12 and hold the opposed inserts 18 in spaced apart relation. Connecting pieces 39 are threaded onto the studs 25, and a rear cover plate 40 of nonconductive material is positioned over the back of the distribution panel. Screws 42 extend through the rear cover plate and into the connecting pieces 39 to fasten the conductors 12 and 14 to the panel assembly 10 and hold them in noncontacting relation.

In use, the input and output circuits are interconnected by inserting the pins 17' of plugs 17 into the openings 15 and 16 at the intersections of the corresponding conductors. The insertion of a pin 17' between any pair of blocking pieces prevents the other blocking pieces from separating sufficiently to enable another pin 17' to be inserted between them. For example, as shown in FIG. 3, the pin 17' moves the blocking piece 30e upwardly a distance D, thereby moving it into engagement against the end of the passageway, defined by the edge member 22 and forces all of the other blocking pieces into end to end engagement. Inasmuch as the other blocking pieces 30a to 30d abut each other, the openings defined by the cutouts 32 and 34 therein are too small to receive additional pins 17', thereby blocking their insertion and preventing unsafe connections of the corresponding output circuit to any other input circuits.

If desired, the panel assembly 10 can be provided with channels each carrying blocking pieces 30, overlying each of the input conductors 12, as well as or in lieu of channels and blocking pieces for the output conductors 14.

The embodiment described above is merely exemplary, and it will be understood by those skilled in the art that it is susceptible of considerable variation and modification without departing from the spirit and scope of the invention. Such variations and modifications are intended to be within the scope of the invention as defined by the appended claims.

I claim:

1. A crossbar distribution panel, comprising a front panel structure, a plurality of first spaced-apart conductors mounted on said panel structure, a plurality of second spaced-apart conductors mounted on said panel structure and insulated from and crossing the first conductors, said first and second conductors having means defining aligned openings at their crossover points, said front panel having corresponding openings therein, pin means positionable in said openings in the panel and into said aligned openings for interconnecting a selected first conductor to a selected second conductor, and means arranged in the front panel for blocking the positioning of said pin means into any more than a predetermined number of openings in any one of said first conductors simultaneously.

2. A crossbar distribution panel, comprising a panel structure, a plurality of first conductors arranged generally parallel to and spaced-apart from each other and mounted on said panel structure, a plurality of second conductors arranged generally parallel to and spaced-apart from each other and said first conductors and crossing the first conductors and mounted on said panel structure, said first and second conductors having means defining aligned openings at their crossover points and said front panel having corresponding openings therein, pin means positionable in said aligned openings for interconnecting a selected first conductor and a selected second conductor, means defining a plurality of channels in the panel structure, one of said channels being aligned with and overlying each of said first conductors, and a plurality of blocking pieces disposed in each of said channels and slidable longitudinally therein, each blocking piece extending between adjacent aligned holes in the panel structure and conductors and the blocking pieces in each slot having a cumulative length relative to the length of said channel such that the positioning of one pin means in one of the openings in a first conductor causes the blocking pieces on one side of said one pin means to move apart longitudinally from those on the other side of said one pin means and to engage the end blocking pieces against the ends of said channels, thereby preventing further movement of the blocking pieces for that conductor and preventing the positioning of any additional pins into the openings of said first conductor.

3. A crossbar distribution panel as claimed in claim 2, wherein openings of substantially smaller dimension than the corresponding transverse dimension of the pin means are defined between each pair of adjacent blocking pieces when they are in contact with each other.

4. A crossbar distribution panel as claimed in claim 2, wherein the blocking pieces are made of a nonconductive material.

5. A crossbar distribution panel, comprising a panel structure, a plurality of first conductors arranged parallel to and spaced-apart from each other and mounted on said panel structure, a plurality of second conductors arranged generally parallel to and spaced-apart from each other and said first conductors and crossing the first conductors and mounted on said panel structure, means defining a plurality of aligned openings in the first and second conductors at the crossover points thereof, said means including elements having substantially greater dimensions in the direction of alignment than that of said conductors, conductive pin means insertable into said openings and contacting the walls thereof over a substantial portion of said greater dimensions of said elements, thereby providing increased electrical conductivity between said pin means and said conductors, and means arranged in said panel structure blocking the simultaneous positioning of said pin means in more than one of said first conductors.

6. A crossbar distribution panel as claimed in claim 5, wherein said blocking means comprises a channel formed in said panel structure aligned with each of said first conductors and having a predetermined length, and a plurality of blocking pieces of nonconductive material slidably disposed for longitudinal movement in said channels, the blocking pieces extending between adjacent holes in said first conductor and having a cumulative length such that when one of said pin means is inserted into one set of aligned holes the end blocking pieces in said channels engage the end walls thereof.

References Cited by the Examiner
UNITED STATES PATENTS

| | | | |
|---|---|---|---|
| 1,946,889 | 2/1934 | Wessel | 339—18 |
| 2,482,998 | 9/1949 | Andersson | 339—18 |
| 2,782,275 | 2/1957 | Vance | 339—18 X |

EDWARD C. ALLEN, *Primary Examiner.*

P. A. CLIFFORD, *Assistant Examiner.*